United States Patent [19]

Gram

[11] Patent Number: 4,470,787

[45] Date of Patent: Sep. 11, 1984

[54] HYDRAULIC PRESS

[75] Inventor: Martin M. Gram, Minneapolis, Minn.

[73] Assignee: MTS Systems Corporation, Eden Prairie, Minn.

[21] Appl. No.: 493,651

[22] Filed: May 11, 1983

[51] Int. Cl.[3] .............................................. B29C 3/06

[52] U.S. Cl. .................................. 425/150; 425/183; 425/185; 425/186; 425/193; 264/40.5

[58] Field of Search ............... 425/150, 183, 185, 186, 425/190, 193, 195; 264/40.5

[56] References Cited

U.S. PATENT DOCUMENTS

| | | | |
|---|---|---|---|
| 2,383,736 | 8/1945 | Rembert | 264/163 X |
| 2,722,174 | 11/1955 | Albers | 100/269 |
| 2,905,032 | 9/1959 | Fuchs | 78/44 |
| 2,980,013 | 4/1961 | Swick et al. | 100/257 |
| 3,531,830 | 10/1970 | Gelin | 18/16 |
| 3,543,344 | 12/1970 | Hunt | 18/16 |
| 3,543,346 | 12/1970 | Breher | 18/30 |
| 3,800,588 | 4/1974 | Larson et al. | 73/71.6 |
| 3,802,818 | 4/1974 | Watanabe et al. | 425/78 |
| 3,825,386 | 7/1974 | Bello et al. | 425/150 |
| 3,908,429 | 9/1975 | Gram | 72/349 |
| 3,918,298 | 11/1975 | Petersen et al. | 73/71.6 |
| 3,921,286 | 11/1975 | Petersen | 308/3 R |
| 3,992,978 | 11/1976 | Petersen | 91/47 |
| 3,994,540 | 11/1976 | Petersen | 308/3 R |
| 4,053,276 | 10/1977 | Ahrweller et al. | 425/406 |
| 4,063,453 | 12/1977 | Gram | 73/103 |
| 4,076,780 | 2/1978 | Ditto | 264/40.5 |
| 4,206,699 | 6/1980 | Hemmelgarm | 100/53 |
| 4,304,540 | 12/1981 | Hammon | 425/150 |

*Primary Examiner*—Jay H. Woo
*Assistant Examiner*—Tinker R. McBrayer
*Attorney, Agent, or Firm*—Kinney & Lange

[57] ABSTRACT

A press system that provides rapid advance of one platen on a movable crosshead through the use of programmed hydraulic controls and is specifically adapted for use with sheet molding compound (SMC) presses. Rapid locking or latching of the crosshead and the platen it carries is achieved through the use of hydraulically operated clamping and release cylinders. The lower platen is supported on hydrostatic bearings permitting the platen to move and at the same time parallelism of the mold halves is maintained by swiveling molding power cylinders. Separate push-back cylinders are used to separate the mold through a short load path so that when the mold "breaks away" there is very little springback to minimize any part breakage during mold stripping.

The lower platen also includes a mounting arrangement that provides the advantages of a rolling bolster or lower platen with a minimum of mounting structure. The control permits accurate rapid molding of plastic sheet parts in particular, which require high controlled force, closely controlled mold movement and operation at elevated temperatures.

17 Claims, 12 Drawing Figures

HYDRAULIC PRESS

BACKGROUND OF THE INVENTION

1. Field of the Invention

The present invention relates to hydraulic presses for molding various materials.

2. Description of Prior Art

A programmable velocity and force control method of compression molding utilizing a large press, and including servo controls for the operation is shown in U.S. Pat. No. 4,076,780. This particular patent illustrates a press device that is operated mechanically, to operate a press ram, but in the final mold closing, hydraulic cylinders are used for controlling the tilting of the mold to maintain the mold parts parallel.

U.S. Pat. No. 3,531,830 shows an apparatus for forming a molded article which includes a type of camming element for regulating the position of stops which control the movement of the molding press in its final molding operation.

A molding press which includes retractable wedge members which are controlled by hydraulic cylinders is shown in U.S. Pat. No. 3,802,818. Additionally, molding machines are shown in U.S. Pat. Nos. 2,722,174 and 3,543,344; and servo hydraulic press controls are shown in U.S. Pat. No. 3,825,386.

The assignee of the present invention has done a substantial amount of work in the field of servo hydraulic controls, including controls for various apparatus which have rigid tables which need to be maintained properly relative to a reference plane. For example, U.S. Pat. No. 3,800,588 illustrates a servo control apparatus for providing a plurality of degrees of freedom control to a rigid structure. Also, variations in this type of control are shown in U.S. Pat. No. 3,918,298.

The assignee of the present application also owns patents relating to hydrostatic bearings and the controls for such bearings. This includes U.S. Pat. No. 3,921,286 and a divisional application which issued as U.S. Pat. No. 3,992,978. Further an external height control for a hydrostatic bearing is shown in U.S. Pat. No. 3,994,540.

A hydraulic cupping press for deep drawing of aluminum cups to be made into cans is shown in U.S. Pat. No. 3,908,429, and a press frame construction that is adjustable is shown in U.S. Pat. No. 4,063,453.

DESCRIPTION OF THE PREFERRED EMBODIMENTS

Figure 1:
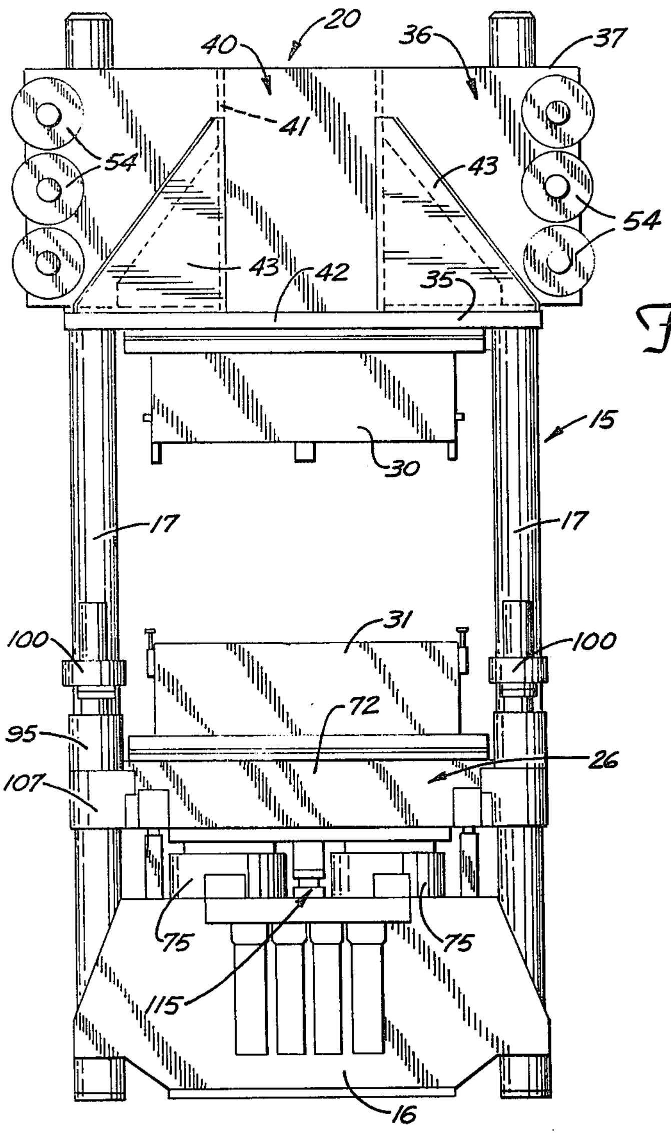
FIG. 1 is a front elevational view of a compression molding press made according to the present invention.

A compression molding press illustrated generally at 15 is supported upon a base 16, and in a usual manner includes four upright smooth columns 17, which mount an upper platen assembly 20. The upper platen assembly 20 is moved vertically along the columns 17 (once it is mounted in place) through the use of a pair of single acting lift actuators 22, one on each end of the machine, having their base ends 23 connected to the base 16, and extendable rods 24 suitably mounted as at 25 to the opposite end portions of the upper platen 20. An LVDT 27 is coupled to the actuator 22 to measure the displacement of the rods 24 for feedback.

A lower platen assembly 26 is supported on the base 16 as will be explained. A compression molding assembly is mounted between the lower platen member 26 and the upper platen, and the mold assembly includes upper mold member 30, and a lower mold member 31. The upper mold member is bolted to or otherwise mounted on the upper platen in a desired manner, and the lower mold is supported on a plate of the lower platen also by bolting or as desired, which will be explained.

UPPER PLATEN ASSEMBLY

Figure 3:
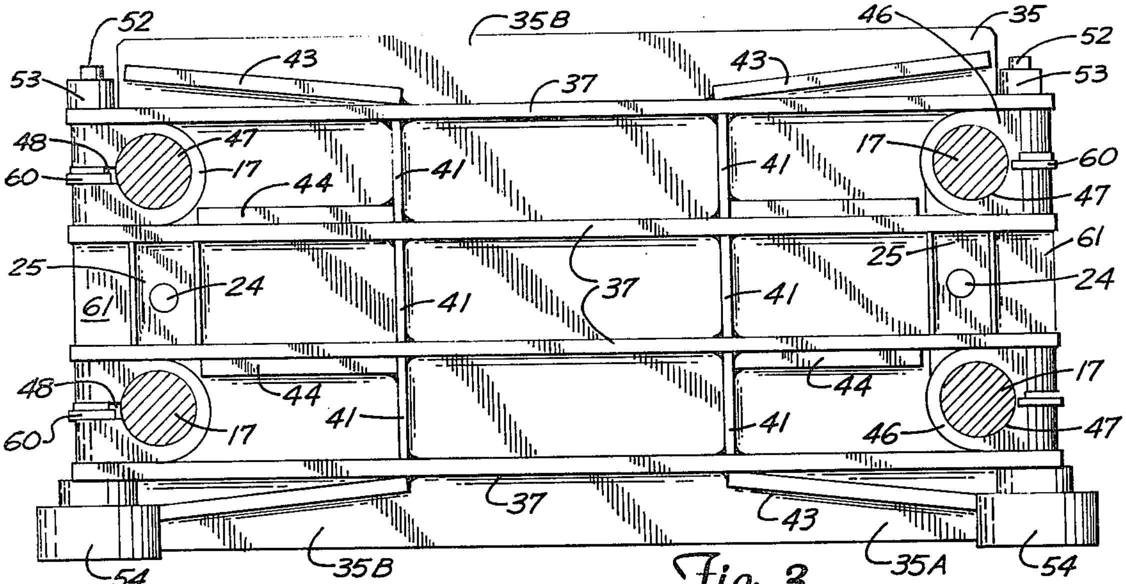
FIG. 3 is a top plan view of the molding press shown in FIGS. 1 and 2.
Figure 4:
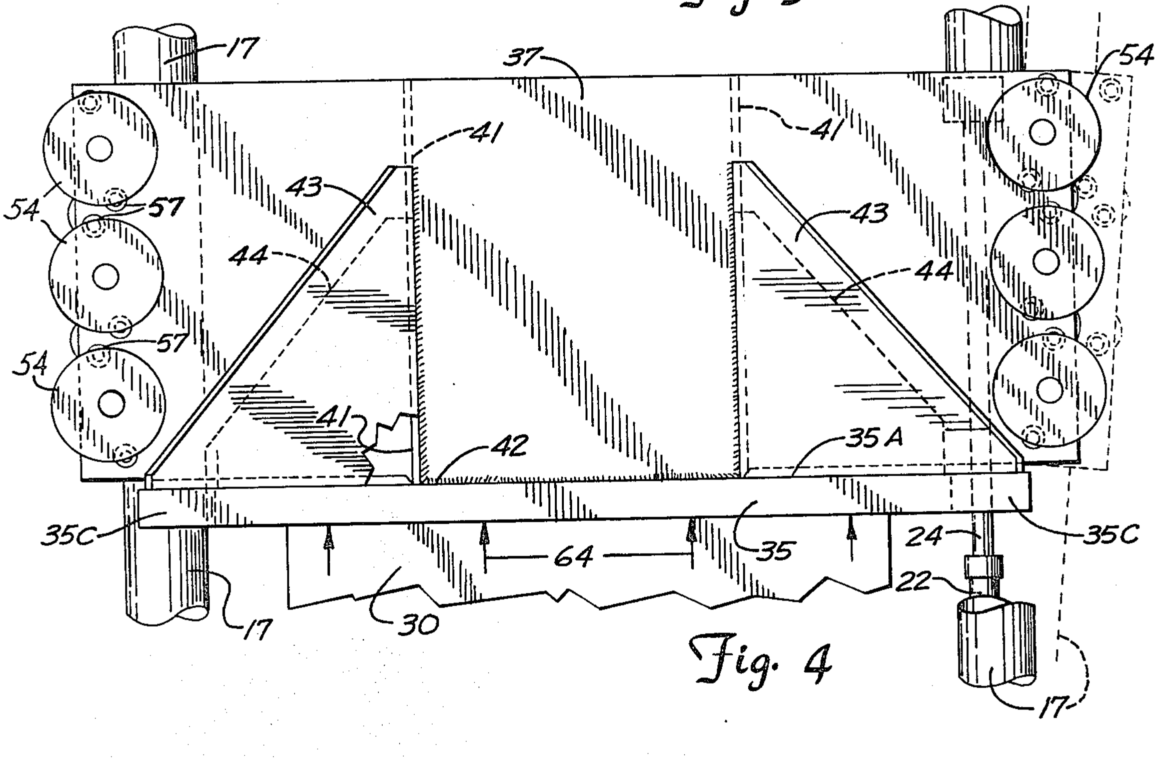
FIG. 4 is a front elevational view of the upper crosshead shown in FIG. 3.

As perhaps best shown in FIGS. 3 and 4, the upper platen assembly 20 includes a flat plate platen 35 that is fixed to and mounted on a crosshead assembly 36. The crosshead assembly 36 is made up of a plurality of large shear webs (four as shown) or plates 37 which comprise generally rectangular plates that are spaced apart and parallel to each other. In the center section 40 of the crosshead 36, a box section is formed by welding vertical tie plates 41 between each of the adjacent shear webs 37. The shear webs 37 have a boss 42 at their lower edge and the plates 41 extend from the plane defined by the lower end of the boss section 42 to the top edge of the shear webs 37. The lower edge of the boss 42 defines a plane spaced from the lower edge plane of the side portions of the shear webs 37.

The platen 35 bears against and is welded to the lower edge of the boss 42 of the shear webs 37. The outer portions of the platen 35 (the portions outside of the boss and vertical plates 41) are held with suitable enforcing gussets or webs that carry the load from the edge portions of the platen back to the center portion 40. The reinforcing webs include corner reinforcing webs 43 at the four corners of the platen 35 which tie back into the outer shear webs 37, and as shown these reinforcing webs are triangular shaped plates extending at an oblique angle to the plane of the webs 37.

Additionally, there are a desired number of center reinforcing webs or gussets 44 between the two center shear webs 37. The webs 44 extend from the center portion 40 laterally outward toward the edges of and on each side of the platen 35. These webs 44 also are triangular in shape and carry loads from the edges of the platen 35 back to the center box section of the crosshead.

This arrangement, as can be seen, spaces the upper surface of the platen shown at 35A from the lower edges of the shear webs 37, except along the boss members 42, which define the lower plane of the center box section 40 formed by the upright plates 41.

Thus the outer edge portions 35B along the sides of the platen 35, and the outer end portions 35C along the ends of platen 35 are cantilevered out from the center box section 40. The webs 43 and 44 carry bending loads near the outer edges of the platen 35 back to the plates 41 and thus to the center portion 40 of the shear webs 37 forming the upper crosshead.

This load support vastly improves the deflection characteristics of the upper crosshead under molding loads, as will be explained.

UPPER CROSSHEAD CLAMPS

The upper crosshead 36 is, as previously mentioned, movable along the columns 17 through the use of the lift actuators 22, and the lift actuators as shown are single acting actuators because the weight of the crosshead will retract the actuators when the pressure is released from the base end of the actuators. The speed of downward movement of the crosshead is controlled by regulating flow out of the base of actuators 22.

In molding operations, it is necessary to clamp the upper crosshead and thus the upper platen and the upper portion 30 of the mold in position once the crosshead has been lowered after the material to be molded has been placed between the mold sections. The present device utilized clamp members that not only positively clamp the upper platen tightly against the column 17, but also are such that they can be slipped laterally out of and into the crosshead assembly to make installation of the long columns 17 easier and to eliminate the need for a large amount of vertical clearance or openings for insertion and removal of the columns themselves.

The clamps are hydraulically actuated, and operate in parallel for each of the columns 17 on the opposite ends of the crosshead 36. The shear webs 37 of the crosshead are spaced apart, as was explained, and each column and column clamp is positioned in the space between two shear webs. The clamp members include a split clamp 46. The split clamps 46 are made from elongated blocks of steel that have a length generally equal to the vertical height of the shear webs 37. The split clamps 46 are made so that they have a bore 47 that is made to receive one of the columns 17. An anti-galling bearing sleeve may be used to line the bore 47. The clamps are split longitudinally and a slot 48 is provided from the outer edge of the split clamp cartridge 46 and open to the bore 47.

The side surfaces of the clamps 46 are planer surfaces that slide into the space between adjacent shear webs 37. As can be noted, each of the clamp members 46 has three crossholes (aligned with the slot 48) that are vertically spaced and which are made to receive actuator rods 52 which in turn are each connected to be operable as crosshead locking actuators. Rods 52 span across the entire width of the crosshead, and thus pass through all four of the shear webs 37, (clearance openings are provided for the rods, of course) and through the two clamp members 46 on each end of the crosshead. Each rod 52 is attached to a suitable load carrying collar member 53 on the outside of one of the outer shear webs 37.

Figure 6:
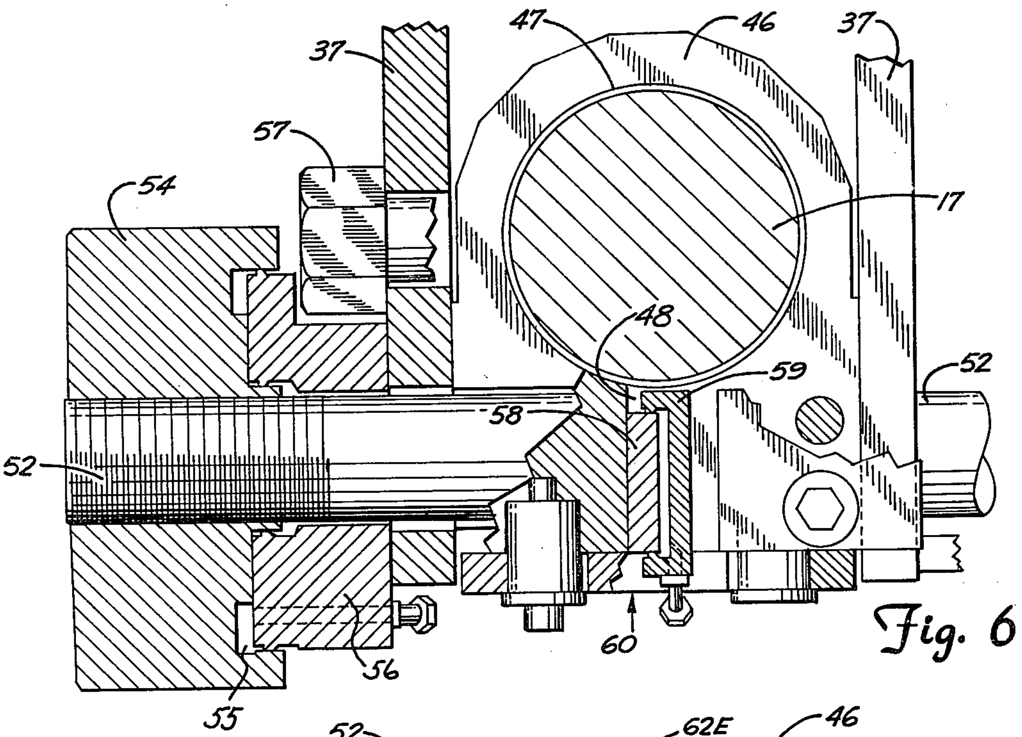
FIG. 6 is a fragmentary sectional view showing the interior of a locking cylinder used with the crossheads shown in FIG. 4 with parts in section and parts broken away.

The rod 52 has its opposite end attached to a movable hydraulic actuator block 54 positioned on the outside of the outer shear web 37 on the opposite outer side of the crosshead. As shown in FIG. 6, the actuator blocks 54 have annular cylinder openings 55 defined therein. The openings 55 are annular or donut-like cylinders. An annular ring piston 56 is fitted within the opening of each cylinder opening 55 and is fixed to the outer shear web 37 on that side of the crosshead. One ring piston surrounds each of the rods 52.

Each of the slots 48 has one or more clamp expanding or release actuators illustrated at 60 (see FIG. 6 as well). These actuators 60 include a piston 58 and a cylinder member 59 each suitably positioned on one surface of the slot 48. There are usually two such release actuators on each clamp 46. Hydraulic fluid pressure is provided to the cylinders 59 to tend to split the slot 48 wider and thereby release the respective clamp from the column 17 by expanding the bore 47. The clamp actuators are operated in parallel and the release actuators also are operating in parallel. One valve may be used for these actuators because when one set is operated, the other set must be released.

It should be noted that spacer tubes 61 are positioned over the rods 52 between the two center shear webs 37 to prevent excessive deflection of the shear webs when the clamps are actuated. When hydraulic fluid under pressure is provided to the actuator cylinder 55, the rods 52 will be loaded under tension and react through the pistons 56 against the outer surface of the shear web 37 on that side of the crosshead, the collar 53 reacts to the tension in rods 52 back to the crosshead so that the tension load in the rods will tend to pull all of the shear web end portions toward each other, thereby clamping the crosshead tightly on the upright columns 17 by compressing the clamps 46. The spacer tubes 61 prevent the inner two webs 37 from collapsing toward each other. A block 25 is seen in FIG. 3 which is for attachment of the rod 24 for cylinder 22.

A feature of the clamps of the present invention is that the cylinder members 54 and the rods 52 can be removed. The cylinder members 54 are threaded to the rods, or the rods may be released from the collars 53 and pulled out lengthwise. When this is done, the crosshead clamp members 46 can be slid laterally out of the ends of the crossheads (after retaining cap screws 57 are removed). The shear webs 37 define slots that are open to the end of the crosshead. The columns 17, along with the clamps, can be tilted sideways as shown in dotted lines in FIG. 4 for installation or removal of the column through the crosshead. The columns 17 may be bolted to the base 16 to permit tilting the columns for installation and removal.

Figure 7:
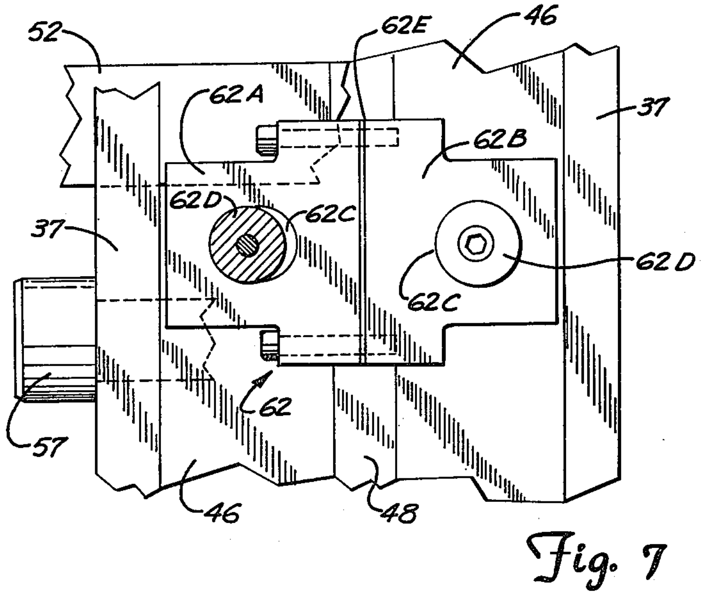
FIG. 7 is a fragmentary side view showing a mechanical clamp opening mechanism used with the crosshead of the present invention.

The crosshead is suitably supported during installation. However, it eliminates the need for extremely tall towers for removal of the columns 17 vertically, or for holes into which the columns 17 could be dropped for removal and service of the crosshead. As shown in FIG. 7, a stop strap 62 may be used to limit the amount the clamps 46 can open. The strap is made of two parts 62A and 62B, which are held together with cap screws. The clamp has elongated openings 62C at its ends, and studs are installed on the clamp 46 on opposite sides of the slot 48. The studs pass through the openings in the clamp straps and the ends of the openings engage the studs to stop the clamp from spreading excessively. The two sections 62A and 62B can be shimmed as at 62E to control the amount of opening.

The mounting of the platen 35 to the crosshead as shown redistributes or redefines the deflection of the platen during use, in an advantageous way for operation in a molding press. It has long been desired to have a very stiff platen and crosshead so that the deflections under molding loads are minimized, for the same amount of steel and weight as in a conventional supporting mechanism. A stiff center section of fabricated plates extends approximately half of the span between the sets of columns, and yet the outer ends of the shear webs 37, are sufficiently flexible laterally so that the webs have an infinite fatigue life under clamping operation. The design is very efficient. The deflection characteristics are shown in FIG. 5 in relation to a conventional crosshead which is merely clamped at its ends and supports a platen or any structure uniformly between its ends.

DEFLECTION OF CROSSHEAD

Figure 5:
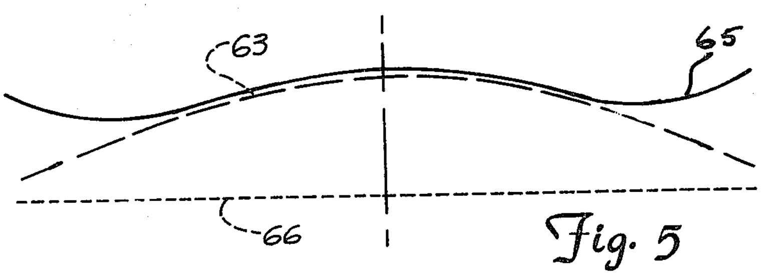
FIG. 5 is a graphic representation of deflection of a standard crosshead end supported crosshead used in presses and the crosshead made according to the present invention.

In FIG. 5, the representation of the deflection curves for a conventionally supported crosshead as shown at 63, and it can be seen that the maximum deflection is thus in the center of the platen, and that the amount of deflection diminishes toward the clamps at the columns. However, under loads indicated by the arrows 64 in FIG. 4, the deflection curve for the crosshead shown in FIGS. 3 and 4 is illustrated by the curve 65 in FIG. 5. It can be seen that with relation to the reference line indicated at 66 that at the center the deflecton of the platen 35 is substantially the same as for a conventionally supported crosshead. At the outer edges of the platen deflection from the base line increases again because the outer edge of the platen 35 is supported by webs or gussets 43 and 44 in place of webs 37. The deflection of the platen from the base line is not diminished from the conventional design, but the distortion or deflection from a best plane surface is diminished substantially. The distortion of the mold is therefore reduced which is beneficial in compression molding operations.

The deflection from a best fit plane surface from a crosshead of conventional design, conventionally supported at its outer ends and having the same amount of steel or weight, as the multiple web crosshead.

CONTROL OF CROSSHEAD

Figure 2:
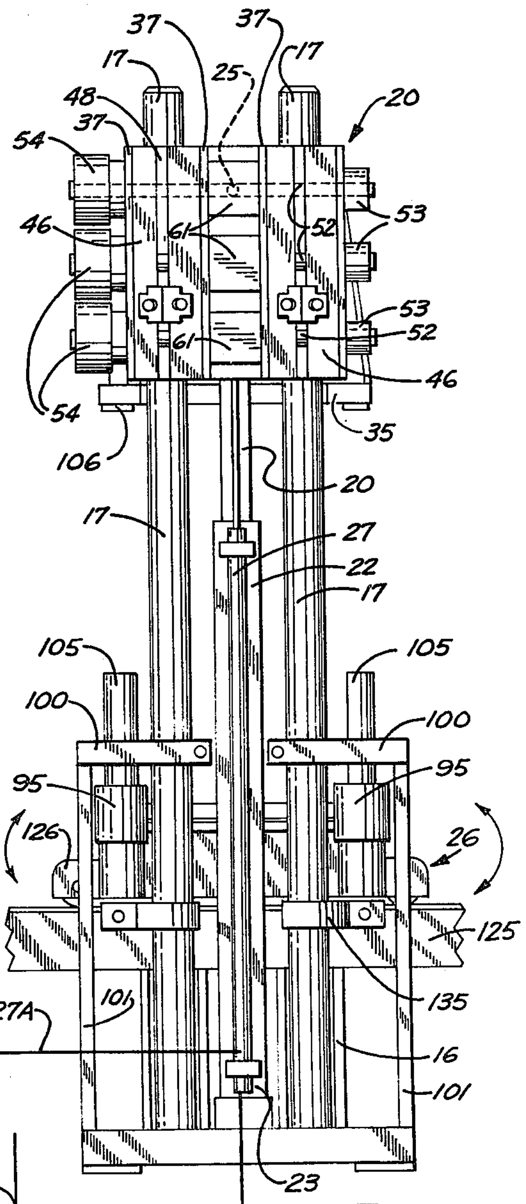
FIG. 2 is a side elevational view of the device of FIG. 1, with parts broken away.
Figure 2:
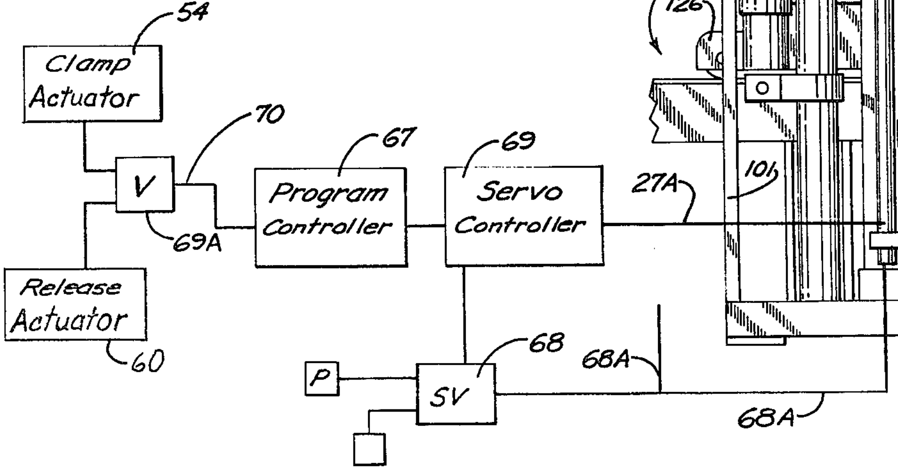

A simplified schematic control circuit for the lift actuators 22 is shown in FIG. 2. The unit is servo controlled, and includes a program controller 67 which supplies overall program control, and a servo controller 69 is used for controlling a servo valve 68 which may be a three-way valve as a function of the program and a signal along line 27A from LVDT 27 indicating the position of the crosshead. With single acting actuators 22, the servo valve will either connect the base ends of the actuators 22 to pressure through parallel lines 68A or will connect these lines to drain to let the crosshead lower under its own weight as controlled by the rate of flow out of the actuators.

The program controller coordinates the movements with the molding operations which are also controlled by hydraulic actuators operating under servo control. If needed, the retraction of the actuators 22 may be prevented by check valves which are pilot operated.

The clamp cylinders 55 of actuator blocks 54 are controlled with a four-way valve 69A, and the clamp forces are released prior to and during travel of the crosshead, and actuators 60 are operated when the actuator blocks 54 are released. Valve 69A may be used for controlling the six clamping cylinders in parallel and the eight release actuators 60 in parallel. The clamp actuators and release actuators are single acting cylinders. The valve 69A may be controlled by a direct electrical signal along a line 70.

LOWER PLATEN ASSEMBLY

The lower platen assembly 26 comprises a heavy plate or structure which is supported relative to the base 16. The base 16 is a structure strong enough to support the loads that are encountered in the molding operation. The lower platen assembly is used for mounting the lower mold half 31, and the mounting of the lower mold half 31 relative to the lower platen is such that in the molding cycle, once the crosshead has been locked in molding position, the lower platen is moved upwardly under controlled force from servo controlled hydraulic actuators.

Figure 8:
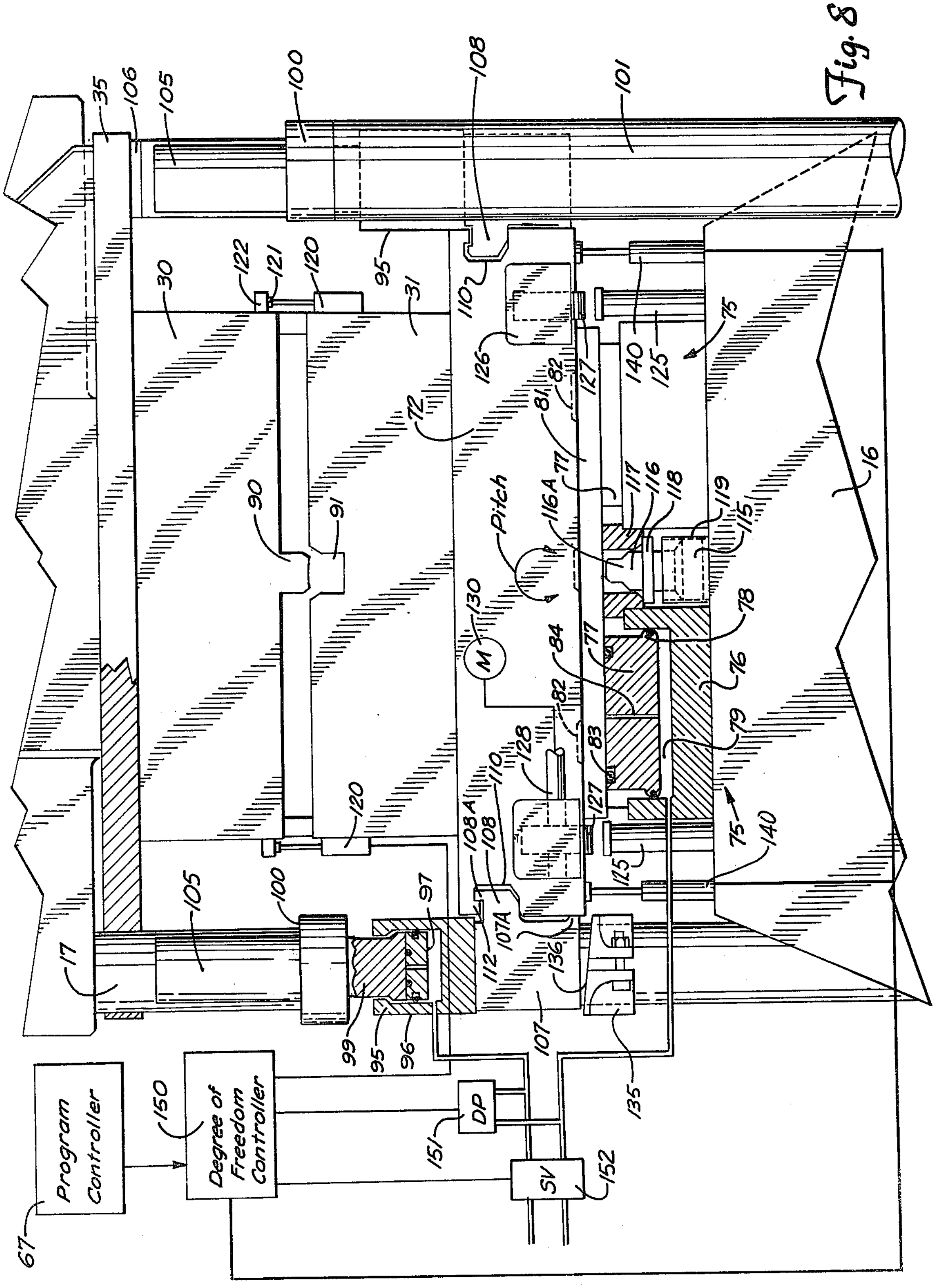
FIG. 8 is a fragmentary front end view of the lower platen utilized with the press of the present invention with parts in section and parts broken away.
Figure 9:
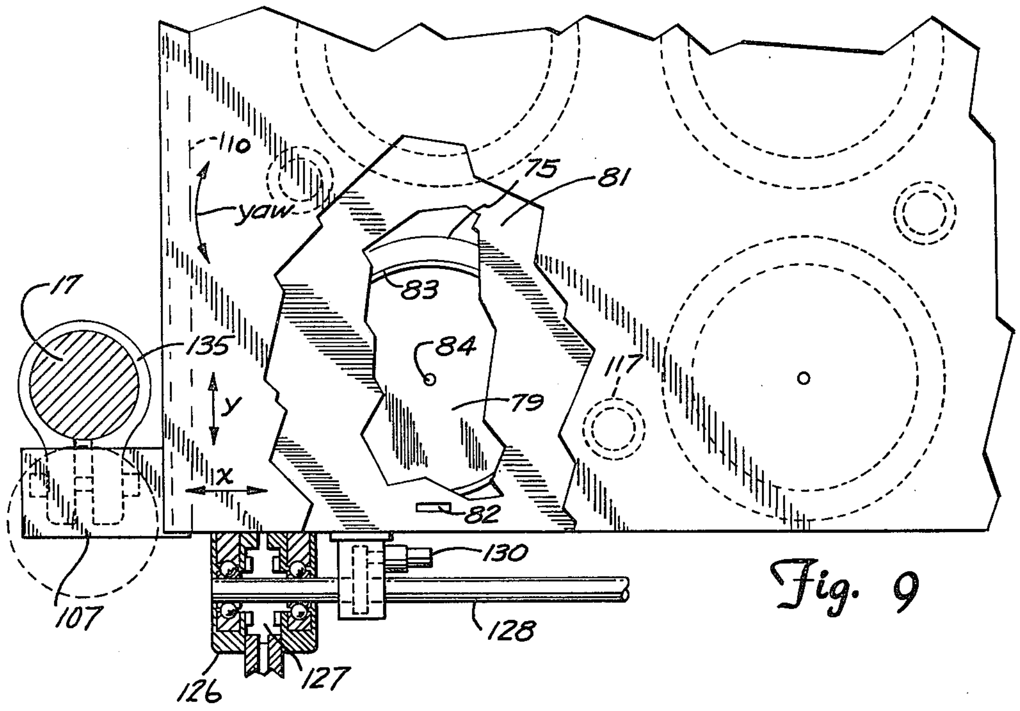
FIG. 9 is a fragmentary top plan view of the platen shown in FIG. 8 with parts broken away.

FIGS. 8 and 9 show the lower platen assembly in part schematic form.

The platen assembly 26 is mounted on an upper portion or surface of base 16, and includes a platen 72 which comprises a support member or bolster for supporting the lower mold half 31. The molding or compression force is generated through the use of actuator assemblies 75 each of which includes an outer cylinder housing 76 fixed in position on the base 16 and an inner piston 77. The inner piston 77 has a peripheral or annular flange 78 forming a part spherical surface or a short cylindrical surface with sufficient clearance to permit the piston 77 to cock relative to the circular cylinder side wall of the cylinder cavity 79 a limited number of degrees. A sealing ring is mounted in a groove on the annular flange to seal the piston. The platen 72 is supported on but is separable in vertical direction from a hydrostatic bearing plate 81. The platen 72 has shallow but precise recesses on its bottom side into which tapered pins or blades will fit, as shown at 82, so that when the plate 81 is bearing on and supporting bolster or platen 72, the two parts cannot slide relative to each other. Once the pins are withdrawn vertically, however, the platen 72 can move relative to the plate 80. A sealing ring 83 (elastomeric) is mounted in a groove on each piston 77 and defines an annular space on the undersurface of the plate 81. A passageway 84 leads from the interior cavity 79 of each actuator and into the space defined by the sealing ring 83. When the actuators are under pressure, pressure of the oil supports the bearing plate 81 on a hydrostatic bearing. The diameter of ring 83 is selected to be less than the effective diameter of the piston 77 for proper operation. The pressure in the hydrostatic bearing is the same as the pressure in the cavity 79 and the hydrostatic bearings (these are four actuators 75 as shown, each with such a bearing) permit the platen 72 and plate 81 to move easily for proper positions of the mold halves even under a molding force. The support pressure in the bearing area defined by rings 83 is a function of the molding force and thus the load carried by the platen 72.

The platen 72 thus is permitted to move on the hydrostatic bearings (within limits that can be provided mechanically by heel blocks) in the Y axis, (which is front to back) and is indicated by the arrow Y in FIG. 9; in the X axis, wich is indicated by the X arrow in FIG. 9 (which is side to side,) and also it can be permitted to move in yaw, that is, a circular motion about the central axis of the piston 77. This arrow is labeled "yaw" as shown in FIG. 9 as well.

Additionally, the platen 72 has to be controlled for "pitch" which is the rotation motion about an axis extending front to rear and parallel to the plane of the platen upper surface, and such motion is indicated by the arrow labeled "pitch" in FIG. 8. The platen has movement in the roll axis, which is the axis extending from side to side, through the center plane of the platen 72, and this roll motion is indicated by the curved arrow labeled "roll" in FIG. 2.

The control of the X, Y and "yaw" movements (three degrees of freedom) is accomplished with tapered heel blocks on the mold halves, as shown in FIG. 8. These are interlocking blocks on the mold members themselves which provide proper fit of the molds, and insure proper wall thicknesses on the molded parts. Such heel blocks are shown at 90, and they fit into mating guideways 91 on the other mold part. As shown, the blocks can be fixed to the upper mold section 30, and the guideways formed on the lower mold section, but in any event four blocks, as shown, are utilized for guiding. The mold halves can no longer rotate about a vertical axis (yaw) and movement in both the X and Y axes is limited. When finally guided in place, these movements are prevented.

There are four of the power actuators located on the lower surface of the lower platen, and as mentioned earlier these are single acting actuators which will bear up against the lower platen and push the lower mold half up against the upper mold half once the cross head has been locked in its proper position.

In order to separate the mold halves without causing breakage of the part, it is important to have very low spring back. There are four stripping actuators or separating actuators utilized, one in each corner. These stripper actuators are also single acting, and tend to push the lower mold half away from the upper mold half, at the same time then, of course, they have to retract the cylinders 77 of the actuators 75. This movement is a relatively short distance for break away purposes only, and it tends to minimize the possibility of damage to the mold part when there is little spring back possible in the loading path.

The separation of stripping actuators thus have a very short oil column and react against a rigid structure connected directly to the clamps, or other suitable fixed support.

Referring specifically to FIG. 8, and also to FIG. 9 for reference, the lower bolster is shown in its position wherein it has been pushed down to separate the mold halves generally as shown in FIG. 8. There is a stripping actuator 95 at each corner of the press assembly, the stripping actuators are positioned to the outside of the individual columns 17. The stripping actuators include an outer housing 96 that has an interior cylinder chamber defined therein, and a piston assembly 97 mounted within the opening, and having an actuator end that extends outwardly from the opening. The end 99 of piston assembly 97 is positioned to bear against a reaction frame member 100. One frame member 100 is mounted at each of the corners of the press. As can be seen in FIG. 2, each frame member 100 may be clamped to the individual column 17 and a vertical leg 101 is attached to the horizontal frame member 100 to react loads back to the base 16. Little spring back is permitted. The size of the members 100 and 101 can be selected to maintain strain at a desired level.

The individual stripper actuators 95 are operated from the same servovalve as the main molding actuator 75 for that particular corner of the press. In other words, the two actuators (95 and 75) together operate much like one double acting cylinder, and when the actuator 75 is under pressure, the actuator 95 is connected to drain through the same servovalve for each of the respective corners of the press. Likewise, when the actuator 95 is under pressure, the actuator 75 at that corner is connected to drain and is permitted to retract.

Alternately, instead of having the frame members 100, to react force, mechanical stop members 105 as shown (FIG. 8) may be aligned with suitable pads 106 on the bottom side of the platen 35 of the upper crosshead near the outer corners, so that the stripping force is applied directly between the lower platen and upper platen through the stop members and pads when they engage. The stop members are mechanical stops for the upper crosshead. There would be four such stops 105, again one at each corner on the respective retraction cylinder 95. The mechanical stops 105 may be adjustable in length, for example, by having the stops made in sections of differing lengths which can be mounted in a combination to provide the desired height according to the necessary mold height.

It should be noted that that actuators 95 are suitably guided for limited vertical movement relative to the frame members 100. The internal piston has a stop so the rod cannot be forced out of the housing. The guides are not shown specifically. They can take any desired form to permit the housing 96 to vertically move without becoming displaced.

In order to carry the separating forces from the stripping actuators 95 to the bolster or platen 72, and at the same time permit the bolster or platen 72 to be rolled in and out horizontally for changing or servicing mold parts, each of the actuators 95 is connected to and bears against a bolster guide block 107. The guide blocks 107 are shown in plan view in FIG. 9, and one is positioned adjacent to each column 17. The guide blocks 107 are relatively short in the "Y" direction as indicated by the "Y" arrow in FIG. 9. The guide blocks 107 each have a side rail 108 on the inner side thereof with an up-turned lip 108A. The rail 108 is made to fit within a longitudinally extending mating slot or groove 110 formed along the sides of the platen 72 and this groove 110 extends fore and aft "Y" direction along the entire length of the platen. As can be seen, the groove 110 has a surface formed by a lock lip 112, which surface mates on the lip 108. A lower slot surface indicated at 111 engages the rail 108 for support. Further, the lower corner 107A of the block 107 bears against the side of the platen.

The block 107, which forms a stripping block can be attached to the housing 96 for the actuator 95 in any desired manner, such as cap screws that would hold the two parts together, or even made as an integral unit.

When the actuators 95 are operated, pressure is released from the cavity 79 of actuator 75, and hydraulic oil under pressure is supplied to the interior housing 96. When the mold is to be separated, four servovalves one for each of the stripping or separating actuators 95 would be operated to connect the cavity 79 of the associated actuator 75 drain, and supply fluid under pressure to the interior chambers of the housings 96 thereby forcing the housings 96 downwardly because the pistons 97 react against the frame members 100 and on through stops 105 and 106 to the upper platen 35. This would in turn force the guideblocks 107 down and the mating surfaces between the guideblocks and the platen 72 would cause the platen 72 to be pushed down at all four corners positively, forcing the actuators 75 to be retracted, and separating the two mold parts.

As will be explained, the control of the molding operation is done with a program control and displacement transducers are used as the feedback for the servocontrolled actuators. When the crosshead and upper platen are retracted, four displacement transducers 140 which are located between the platen 72 and base 16 provide feedback control for platen position as regulated by the actuators 75 and 96 each reacting oppositely on platen 72. There are at least three such transducers 140 and, as shown, there are four such transducers to provide information about vertical height and the orientation of the platen with respect to a horizontal plane.

The final feedback for the controls for molding is accomplished with four displacement transducer (LVDT) 120 which are fixed to the lower mold half 31 on each of the four corners of the mold. Transducers 120 have spring loaded ends 121 which are positioned to engage small lugs 122 attached to the upper mold half 30. The transducers 120 will be switched into the control circuit when the crosshead is latched in its lowered position and transducers 140 are utilized when the crosshead is raised.

When the mold halves are retracted as shown so that the heel blocks 90 no longer are retained in the guides 91, because the forces to release the part from the mold can be unbalanced horizontally, it is possible for the platen 72 to become grossly misaligned.

Thus, it is desireable to have some mechanical locator for the lower platen when it is retracted (lowered).

To accomplish this mechanical limitation of movement of the lower platen 72 and the bearing plate 81, a plurality of hydraulic actuators 115 are provided. The actuators 115 include a cylinder and internal piston which is connected to a pin member 116. The pins have narrow ends 116A and a tapered shoulder joining the end with the main pin body. The main body of end pin 116 fits snugly within a short sleeve 117 that is fixed to the bottom of the plate 81. The actuators 115 are positioned between the actuators 75, and thus are in four locations adjacent to each of the edges of the plate 81 approximately midway along the respective edge of the plate.

The pins 116 further have a flange 118 thereon which is of size so that it will engage and support the sleeve 117, plate 81 and platen 72 when the platen has been retracted to the position shown in FIG. 8. The pin 116 forms a part of the piston rod, and the interior piston is mounted within the actuator housing 119, which defines an interior chamber for hydraulic fluid under pressure provided by a suitable valve at a suitable pressure to form a fixed downward stop for the platen against movement beyond the position shown in FIG. 8; the stop actuators 115 will prevent downward movement against the forces generated by the stripping actuators 95. In other words, unless the hydraulic fluid under pressure is released from the housing 119, the lower platen 72 cannot retract more than the position which is generally shown in FIG. 8.

The pins 116, in particular the main cylindrical body portion shown, positively locate the bearing plate 81 in relation to the hydrostatic bearings, and actuator 75, and even though the slot 110 has some clearance relative to the rail 108, the lower bolster 72 and lower mold half 31 remain properly positioned during the time when the upper mold half 30 and crosshead 20 are retracted.

Thus, it can be seen that the rigid platen 72 is supoted directly by the actuators 75 which provide the molding force through the hydrostatic bearing plate 81 to the platen 72. Additionally, the stripping actuators 95 provide a short load path between the upper mold half 30 through the rigid crosshead, the vertical columns 17 and the reaction members 100 to separate the mold halves with little spring back. Having one of each of the single ended actuators 75 and 95 at the same corner controlled from one servovalve simplifies the operation and lowers cost.

Platen 72 forms a rolling bolster, and it is made so that it can be rolled out on to support rails for changing the mold halves and servicing the bolster or mold as desired.

As shown in FIG. 8 and also in FIG. 2, the base 16 supports a pair of spaced-apart, parallel rails or tracks 125 which are positioned outside of the actuators 75 and run forwardly from the press a desired amount. The platen 72, as shown, has wheel housings 126 mounted at the front and rear sides thereof and the wheels shown at 127 are directly above the rails 125. At the forward end, the wheels are mounted onto a cross shaft 128 which is mounted in the housings on suitable bearings and extends laterally across between the two housings 126. The shaft 128 is driven by a hydraulic motor 130 through a gear or chain drive in a conventional manner. The wheels 127 on the front side of the bolster or platen 72 are powered selectively by operation of a suitable valve to power the motor 130.

The wheel housings 126 on the back side of platen 72 are merely idler wheels that are mounted on shafts which are rotatably mounted in the wheel housings.

As shown in FIG. 8 in the normal stopped position of the platen 72 and bearing plate 81, the wheels 127 are spaced from the upper surfaces of the tracks 125. However, when the platen 72 is to be removed, the fluid pressure in the housings 119 of actuators 115 is released, permitting the pistons and the attached pins 116 to retract in the housing thereby lowering the collar 118 and permitting the platen to lower as the main actuator 75 compress until the wheels 127 contact the rails 125. The weight of platen 72 urges it downwardly, and the blocks 107 will also then move downwardly.

Attached to each of the columns 17 immediately below the respective block 107 there is a stop collar 135, which is a split collar that can be clamped around the respective columns 17 and which has outwardly extending ears as shown in FIGS. 8 and 9 that is of substantial length. When clamped together, the ears form an inclined surface shown at 136 in FIG. 8. This inclined surface is positioned to engage the under surface of the respective block 107 and to cause the block to tilt as it moves downwardly. This in turn will cause the rail 108 to cock slightly in the groove 110, thereby releasing the contacting surfaces at 111, 107A and between the lips 108A and 112. The blocks 107 rest on upper surface 136, and the platen 72 is released from the rails 108 so that the platen can be moved out along the tracks or rails 125. By powering the motor 130, the platen and the attached mold half 31 can be moved to a position where the mold can be serviced or changed.

It should also be noted that the bearing plate 81 has sufficient weight to retract the pistons 77 and provide a clearance between the upper surface of the plate 81 and the lower surface of the platen 72 so that the pins 82, which are very shallow, will clear the lower surface of the platen when the platen is rolled out. Plate 81 stays in position so that the hydrostatic bearings formed are not damaged and in particular seals 83 are not subjected to scuffing forces nor is there any oil leakage.

When the platen 72 is to be replaced, it merely has to be rolled back into position with rails 108 within the grooves 110. The locating pins 116 are actuated by providing fluid under pressure to the housings 119 to raise the plate 81. The pins and mating receptacles 82 are interlocked so that the platen 72 is properly positioned.

As the mold halves are moved together from their position shown in FIG. 8, the sleeves 117 will draw upwardly to align with the narrow part 116A of the pins 116, and the bolster or platen 72 is then free to align properly as the heel blocks 90 enter the guides 91. Some float in the X and Y axis thus is permitted so that the heel blocks do the final alignment, although the pins 116 hold the mold aligned initially.

In the servovalve controls for the actuators 75 and 95, the program controller 67 provides the program for operation of the press, and controls when the crosshead is moved and clamped and when actuators 75 are to be operated to force the mold halves together. The signal from the program controller that locks the clamp cylinders 54 with the crosshead in its proper location as sensed by the LVDT's 27 on actuators 22 is also provided to a controller 150, called a degree of freedom controller.

The degree-of-freedom controller 150 is the controller which maintains the lower platen 72 properly oriented in relation to the upper mold half and which controls closing movement. The controller 150 follows a program which can be generated in a known manner for servo control and receives feedback from the sensors 140 until the crosshead is clamped.

The signal which operates the crosshead clamps also activates an electronic mode control switch that switches the feedback to the sensors 120. Force feedback from actuators 75 also is used for force control in the molding operation, and differential pressure transducers 151 provide such force feedback for each actuator 75 and its related stripping actuator 95.

There is a separate servovalve 152 for the actuators at each corner of the platen 72, and thus there are four such servovalves and each receives a control signal from controller 150.

The servovalves control flow from a pressure source and to a drain, in a conventional manner. The signal to each of the servovalves 152 is derived from position sensing as well to determine the proper displacement of each of the actuators 75 so that the bolster 72 is not forced out of a parallel relationship to the upper mold half 30. Control is thus related to the multiple axis control system disclosed in U.S. Pat. No. 3,800,588. It should be noted that the displacement feedback control from the LVDT's 140 is utilized only until the displacement transducers 120 come into the circuit, and an electronic switch will switch the controller to sense the feedback signals from the transducers 120 automatically when the clamps lock the crosshead into its molding location with mold half 30 near the lower mold half 31.

As stated previously, as the mold closes the heel blocks 90 provide control for Yaw and X and Y movement. This provides control or restraint in three degrees of freedom. In order to control pitch, roll and the vertical movement of the platen 72 to insure parallelism of the mold halves, actuators 75 are precisely controlled.

Figure 12:
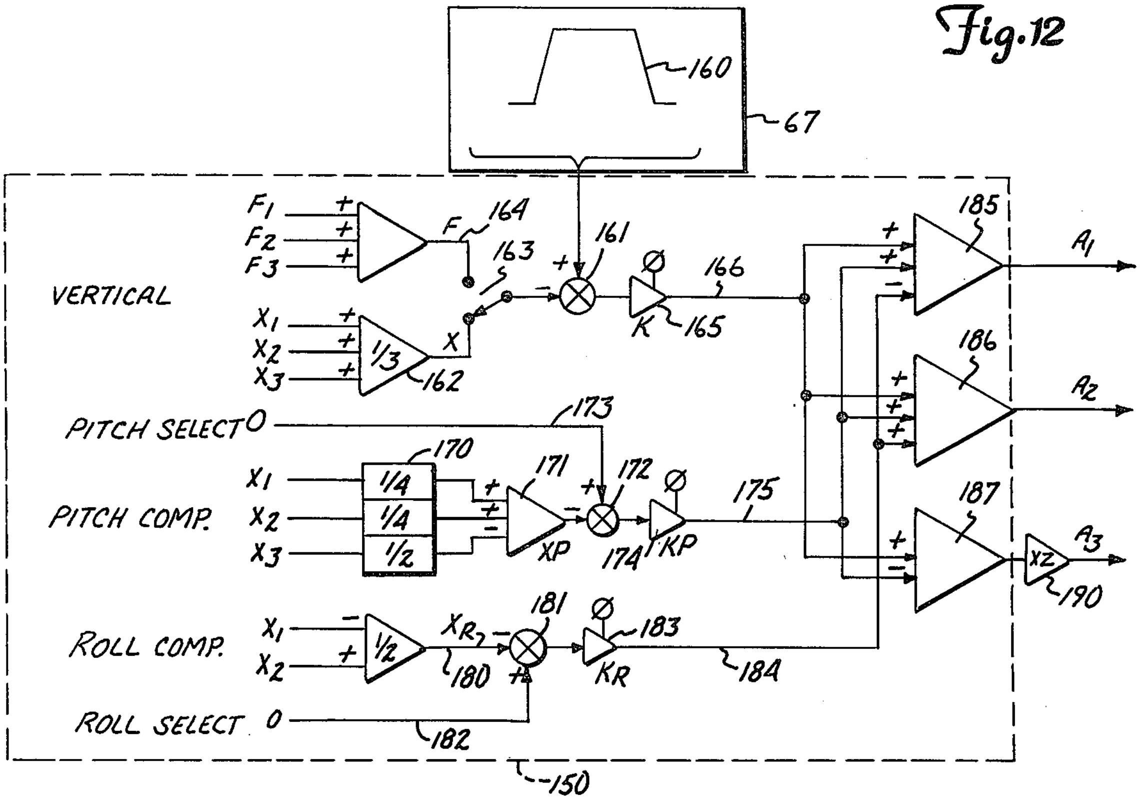
FIG. 12 is a schematic representation of a control circuit related to FIG. 10.
Figure 11:
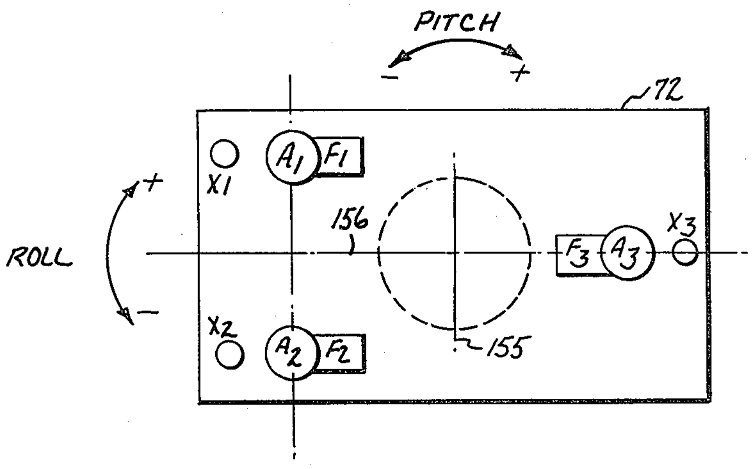
FIG. 11 is a schematic representation of a lower platen to illustrate a basic servo control concept to maintain a lower platen parallel to a reference, such as an upper mold half during a press operation.

At least three actuators and three displacement transducers between the base and platen to be maintained parallel to the upper mold are necessary. The general case application is shown in FIGS. 11 and 12 and shows schematically the application of the degree-of-freedom control to the present platen. In FIG. 11 the platen 72 is represented schematically, and, for example, parallelism is to be maintained relative to the upper mold half in pitch indicated by the arrow labeled pitch about an axis 155, (the same as that shown in FIG. 8 about which pitch is being controlled) and the roll which is about an axis of 156 is also controlled. In order to properly do this in the general case, equal size actuators labeled $A_1$ and $A_2$ are positioned on opposite sides of the axis 156 and at the same distance from this axis for simplification; and a third actuator $A_3$, which is double in area to each of the actuators $A_1$ and $A_2$ is provided at the opposite end of the platen and centered on the axis 156. Thus, the control of the roll about the axis 156 is determined by the displacement of the actuators $A_1$ and $A_2$ relative to each other. The actuator $A_3$ is positioned an equal distance from the axis 155 as the actuators $A_1$ and $A_2$, for the simple case, and the relative vertical position of actuator $A_3$ relative to actuators $A_1$ and $A_2$ determines controls position in relation to pitch. The displacments are sensed by displacement sensors $X_1$, $X_2$ and $X_3$, which correspond to the sensors 120 for this case (or to the sensors 140 as long as the sensors 140 are in control). The displacement signals correspond to the vertical positions of the respective actuators $A_1$, $A_2$ or $A_3$. Additionally, differential pressure transducers can be utilized to determine the force exerted by each of the actuators and these sensors are designated $F_1$, $F_2$ and $F_3$. These force sensors can also be used for force balance control as described in U.S. Pat. No. 3,800,588.

The transducers $X_1$ and $X_2$ are equal distance on opposite sides of the axis 156, and are the same distances from the axis 155 as the displacement sensor $X_3$.

Figure 10:
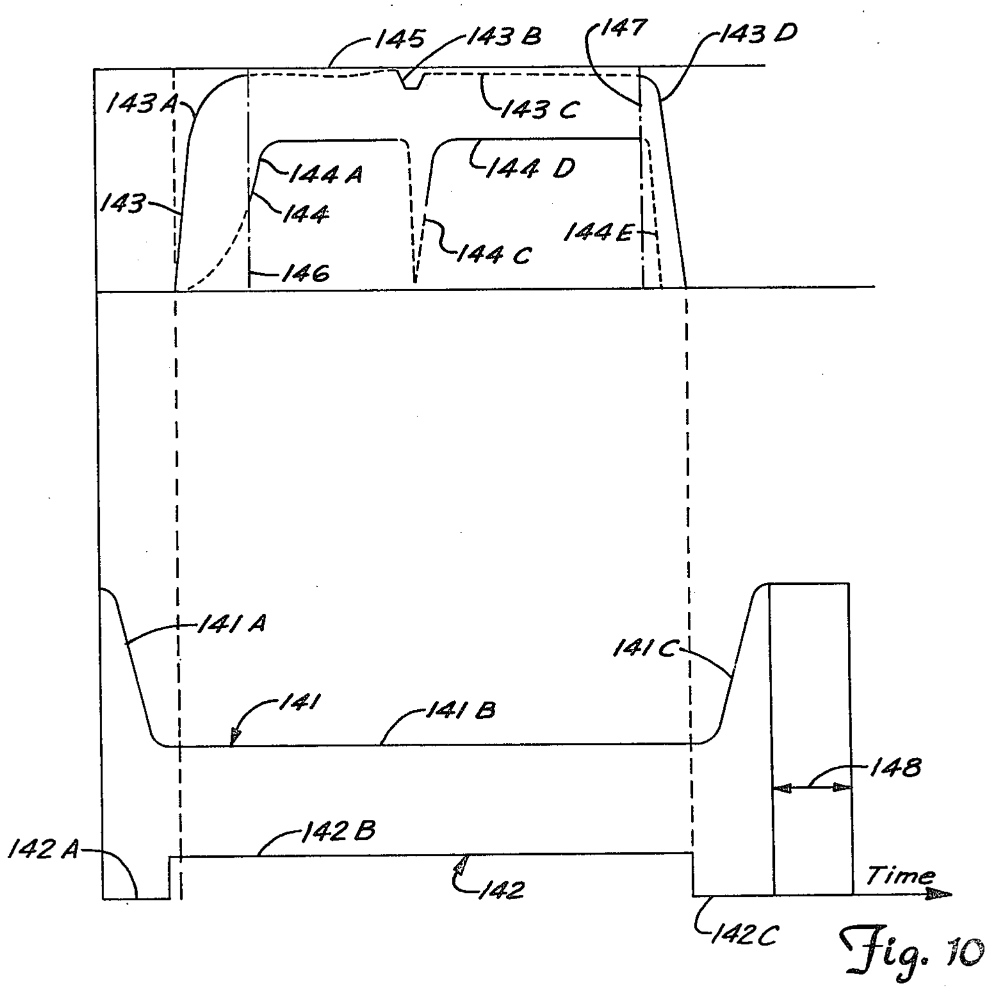
FIG. 10 is a graphical representation of the sequence of operations of components of the molding press in a press cycle.

The program controller 67 shown in FIG. 12 generates a command signal shown in FIG. 10 for mold control and which is represented schematically at 160. The command signal is provided to a summing junction 161 forming part of a degree-of-freedom controller 150.

The inputs from the displacement transducers are labeled in FIG. 12 ($X_1$, $X_2$ and $X_3$), and it can be seen that in displacement control, an average displacement signal is provided to the summing junction 161 from an averager 162.

For force control as represented in FIG. 10, an electronic mode switch indicated at 163 is tripped to provide an average force signal from the force transducers $F_1$, $F_2$ and $F_3$ along the line 164 to the summing junction. The average displacement signal or the average force signal is provided to the summing junction 161, and the summed signals then comprise an error signal along a line 166 which provides the main error signal control for the servovalves after passing through a suitable amplifier 165.

Compensation signals are needed to insure that the mold parts stay parallel in rapid operation and pitch compensation is provided by utilizing the displacement signals from the displacement transducers and weighting them properly by suitable dividing amplifiers or signal conditioning equipment indicated at 170. The signals from displacement transducers $X_1$ and $X_2$ are divided by four, while the signal from displacement transducer $X_3$ is divided by two, because it is the only transducer at that particular end of the platen 72. If four displacement transducers were utilized as shown in FIG. 8, there would be a fourth signal $X_4$, and each of the signals would then be divided by four at the signal conditioning equipment 170. The signals from the transducers $X_1$ and $X_2$ are provided to plus inputs of a summing amplifier 171, and the signal from the transducer $X_3$ is provided to the minus input of this same amplifier and thus the signals are averaged to a summing junction 172. The average signal is summed with a signal along the line 173 representing a desired amount of pitch signal (for parallel this signal is zero) and amplified at amplifier 174. Then this signal is provided along a line 175 which leads to control amplifiers for each servovalve in the circuit.

The roll compensation in this particular instance is achieved by dividing the signals from displacement transducers $X_1$ and $X_2$ by two (they're the only transducers which control roll above the axis 156) and this signal on line 180 is an average roll signal provided to a summing junction 181 wherein it is summed with a signal from a line 182 that will permit some roll to be selected. For parallel operation the signal on line 182 is zero. The signal is provided with a weighting factor at amplifier 183 and provided along a line 184 to the valve controls.

In this particular instance, each of the actuators $A_1$, $A_2$ and $A_3$ has a separate servovalve controlling them, and the signal from line 166 is provided to a valve amplifier for each of the actuators. The signals to the valve amplifier are indicated as A., $A_2$ and $A_3$ at the outputs of amplifiers 185, 186 and 187.

In control, the error signal along line 166 is provided to a plus input of the individual summing amplifier 185 for actuator $A_1$, amplifier 186 for actuator $A_2$ and amplifier 187 for actuator $A_3$. Additionally, the summed signal indicating the pitch error is provided along the line 175 to plus inputs at the summing amplifiers 185 and 186, and a minus input at the amplifier 187, which is for actuator $A_3$. This means that as far as pitch is concerned, the correction can be made by permitting $A_3$ not to extend so far while $A_1$ and $A_2$ are extended, or permitting $A_3$ to extend while $A_1$ and $A_2$ are not extended as far during each cycle.

The error signal for roll compensation is provided along 184 and is provided only to the summing amplifiers 185 and 186 for actuators $A_1$ and $A_2$, because actuator $A_3$ does not control roll. Thus the signal on line 184 goes to a minus input on amplifier 185 and a plus input on amplifier 186. This, of course, indicates that the correction for any error in roll can be done by extending one of the actuators $A_1$ or $A_2$ relative to the other.

The signal from amplifier 187 is multiplied times two in an amplifier shown at 190, because the actuator $A_3$ had the same volume as actuators $A_1$ and $A_2$ together in the shown case. The signals are provided to the servovalves in a normal manner. If there were more actuators (such as four), the roll control would be supplied to summing amplifiers for the actuators on opposite sides of the axis 156 at the end of the platen 72 where actuator $A_3$ is now located, and an additional summing amplifier would thus be provided for an additional servovalve.

If the actuators were positioned at different distances from the respective axes where they can be controlled, the signals could be weighted in proportion to the distance from such axis.

Thus, the molding press lower platen is controlled hydraulically in three degrees of freedom, vertical (Z), pitch, roll and mechanically with the heel blocks in three different degrees of freedom (X, Y and Yaw). The platen is thus precisely controlled to maintain parallelism between the two mold halves as sensed by the displacement transducers.

FIG. 10 is a diagram which illustrates the control functions of the major operations in the molding press of the present invention, as determined by the program controller. A full cycle for the molding operation is shown in FIG. 10, and increasing time is toward the right. The start cycle is the vertical line to the left, and the first operation that occurs is shown along line 141, which is the representation of upper crosshead position in relation to time. Line segment 141A shows the crosshead being lowered, and line segment 141B is with the crosshead in its lowered position with the upper mold half properly positioned for the molding operation. The clamp actuator cylinder operation line is shown at 142, and has only two positions. The lower position segment shown at 142A is with the crosshead clamped in position. The clamp actuator cylinders are then under pressure.

The curved ends of line segments 141A and 141C are generated electronically as a program signal to the servocontroller 69 of FIG. 2. These curved portions of the program signal provide smooth acceleration and deceleration of the very massive (in most cases) upper crosshead assembly. This smooth motion is important to reliable operation of this invention.

At the time the upper crosshead reaches its mold position, where the line segment 141A joins line segment 141B, the crosshead clamps are actuated rapidly and lock the crosshead in position. As soon as the crosshead is locked, the actuators 75 will start to be operated by the servovalves 152. The upper portion of the timing diagram shown in FIG. 10 is related to the mold operation, and more particularly to the movement of the lower platen 72 and the mold half 31 which is carried thereby. Two curves represent mold operation. The upper curve indicated at 143 represents mold displacement, and the lower curve indicated generally at 144 represents mold force.

As soon as the actuators 75 start moving the mold toward its closing position, the movement of the actuators is under displacement control as represented by the solid line segment 143A. It can be seen then that the mold has moved up to substantially contiguous to the upper mold line, represented by the horizontal line 145. The slight gap shown is for compressing the charge material in the mold which spaces the mold halves by the thickness of the sheet being molded.

As soon as the mold is closed, at the time represented by the vertical line 146, the control of the actuators 75 is switched electronically to force control, as represented by the solid line segment 144A of line 144. The force is maintained as indicated by the line segment 144B for a desired length of time to cure the compound being molded (heat is usually also applied).

In the case where the mold must be opened to inject a coating for coloring or other purposes, displacement control will be switched in as indicated by the U-shaped solid line segment 143B, and the force indicated by the dotted line section 144C will reduce rapidly as the mold opens. Then, as soon as the injection of coating has taken place, the mold displacement control moves the mold to its closed position (the "up" portion of line segment 143B) and as represented by the dotted line 143C is again closed, while molding force represented by the solid line segment 144D will be applied and control the pressure on the mold until the full cure time is achieved as represented by the vertical line 147.

Then, displacement control will again be switched into the controller for operating the actuators 95 (and releasing actuators 75) to open the mold, and this displacement control line is represented by line segment 143D showing that the mold is opening, and the force is also dropping off as indicated by the line segment 144E.

When the mold has started to open and has broken away, it can be seen that the crosshead clamps will be released as indicated by the line segment 142C and the release actuators 60 are then pressurized, and the crosshead will be lifted as indicated by the line segment 141C to its raised position. When the crosshead has been retracted, the length of time represented by the double arrow 148 is used for unloading the part that has previously been molded and putting a new charge in the mold, and then the cycle will be repeated.

Thus, the controller will provide the signals for operating the crosshead control signal cylinders, the clamps and the molding and stripping cylinders. The clamp cylinders are not servo controlled and will receive full hydraulic pressure when the valve 69A is actuated to operate those cylinders (and release the actuators 60) to positively clamp the crosshead in position.

In FIG. 10, the switching between force and displacement control of the mold (lines 143 and 144) is done electronically in a known manner. The solid portions of the lines 143 and 144 represent when that mode of control is active, while the dotted portions indicate that mode of control is passive or switched out of the circuit.

The program for operation may be developed from existing controllers which will provide electrical signals to provide the movements and forces indicated in FIG. 10.

It should also be noted that while a vertical press is shown, the column can be horizontal, if desired, and the molding cylinder 75 may be operable relative to the moving crosshead. The disclosed hydraulic press may thus be used for injection molding machines, forging presses and similar presses.

What is claimed is:

1. A sheet molding compound press comprising a base, a plurality of columns longitudinally elongated and extending from said base, a crosshead slidably mounted for movement along said columns, clamp means on said crosshead and engaging said columns, first hydraulic actuator means for closing said clamp means and clamping said crosshead relative to said columns, second hydraulic actuator means mounted relative to said base and having extendable and retractable means connected to said crosshead, a first mold part mounted on said crosshead, a second mold part mounted on said base, and third single acting hydraulic actuator means between one of said mold parts and its respective mount, for providing molding pressure between said mold parts when said crosshead is held in position by said clamps adjacent said base, separate fourth actuator means mounted adjacent the outer edges of the mold parts and mechanically connected to the mold parts through only portions of the platen and crosshead outwardly of the mold parts, control means to sequentially move said crosshead from a position spaced from said base to adjacent said base, to clamp said crosshead, to operate the third actuator means to move the mold parts together to mold sheet compound between said mold parts, and to subsequently release the third actuator means and operate the fourth actuator means is separate the mold parts, said control means including a single servovalve operating each fourth actuator means and a corresponding third actuator means simulaneously.

2. The apparatus of claim 1 wherein said mold parts which is moved by said third actuator means comprises the mold part supported on said base, and said fourth actuator means reacting load from said base back to said second mold part to separate the two mold parts.

3. The apparatus of claim 1 wherein the one mold part is mounted on a rigid platen, said third actuator means comprising at least three individual actuators each controlled by a separate servovalve and positioned to control displacement of the two mold parts relative to each other about two mutually perpendicular axes defining a plane parallel to the plane of said mold parts and generally transverse to the direction of movement as the mold closes, means to sense displacement of the mold parts in at least three locations that provide feedback signals representing the position of the mold parts about said axes, and further control means sensitive to said means to sense displacement to provide a signal to each of the servovalves operating said individual actuators which is a function of the position signals of all of said means to sense displacement.

4. The apparatus of claim 1 wherein the clamp means comprise a split clamp on each of the columns, the first hydraulic actuator means comprise an individual first actuator operable to close each one of the split clamps, and fifth hydraulic actuator means positioned in the split of each of said split clamps and operable to force said split to widen and said clamps to open when the fifth actuators are supplied with fluid under pressure.

5. A servocontrolled press comprising a base, a crosshead, means to mount said crosshead for movement toward and away from said base, a first platen mounted on said crosshead, a second platen mounted on said base, a first mold part mounted on said first platen, and a second mold part mounted on said second platen, said mold parts separating along a mold parting plane and being operable when moved together to mold a part, heel block means on said mold parts to align said mold parts and to prevent substantial shifting in direction along said parting plane, and to prevent relative rotation of the mold parts about an axis perpendicular to said parting plane as the mold parts move, hydrostatic bearing means to provide the sole support for bearing loads of said second platen relative to said base comprising at least one hydraulic actuator mounted between said base and said second platen, and operable to bear against and move the second platen relative to said base toward the first platen through the hydrostatic bearing means, each of the actuators having an actuator surface facing said second platen, seal means on each of said actuator surfaces defining a chamber slightly smaller than the diameter of the actuator, said seal means bearing against the surface which is to move on the hydrostatic bearing means, and a passageway between the interior of each actuator and its associated chamber to provide fluid under pressure from the interior of such actuator to its chamber to tend to support said second platen.

6. The apparatus of claim 5 wherein said actuators for moving said platen relative to said base comprise a plurality of actuators movable in direction toward the first mold part, said actuators being mounted so that movement about two mutually perpendicular axes parallel to the parting plane of the mold can be controlled by individual movements of said actuators, individual servovalve means to individually control each of the plurality of actuators, means to sense the movement of said mold parts relative to each other about said mutually perpendicular axes, said means to sense providing feedback signals indicating the position of each of said means to sense individually, and means to combine the signals of said means to sense with a program control signal to provide a separate signal to each of the servovalve means individually which compensates the program signal as a function of the signals from each of said means to sense to provide accurate control of the position of the mold parts about said mutually perpendicular axes.

7. The apparatus of claim 6 and separate stripping actuator means mounted to the exterior of the periphery of the mold parts for exerting a force tending to separate said first platen and said second platen, said stripping actuators being operable to retract the plurality of actuators operating said second platen, each of the stripping actuators being mated with one of the plurality of actuators operating said second platen, and a separate servovalve for each of the plurality of actuators operating said second platen which also is connected to operate the mated one of the stripping actuators.

8. The apparatus of claim 7 and stop means operable between said base and said second platen to limit the amount of movement of said second platen toward said base under action of said stripping actuators.

9. The apparatus of claim 8 and a pair of rails mounted on said base beneath said second platen, wheel means on said second platen aligning with said rails, said stop means being selectively retractable to permit said second platen to move downwardly so the wheel means contact said rails to permit said second platen to move along said rails when the stop means have been retracted.

10. The apparatus of claim 9 wherein said stop means comprise pins having tapered ends most closely adjacent to said second platen, and depending guides on the second platen to receive each of said pins, said guides being mounted to extend below said second platen, said pins having a surface portion that fits closely within said guides with the second platen in its stopped position after movement thereof by said stripping actuators, and said pins being tapered sufficiently to permit said second platen to move relative to the tapered ends of said pins as said second platen is moved away from the base to its molding position.

11. The apparatus of claim 9 wherein said second platen includes an assembly of a main platen block and a flat plate, said plate being mounted directly over said plurality of hydraulic actuators, said chambers forming said hydrostatic bearings being open to the bottom of said plate, the main portion of said second platen being separable from the opposite surface of said plate, means to normally position said second platen and said plate for restraining substantial sliding movement therebetween, and said second platen being supported above said last mentioned means when the stop means are retracted and the wheels of the second platen are supported on said rails, said wheels being mounted on the main portion of said platen.

12. The apparatus of claim 5 wherein the hydraulic actuators have pistons with wall portions which permit tilting of the actuator surface within the chamber therefore during use.

13. A press comprising a base, a crosshead, means to mount said crosshead for movement toward and away from said base, a first platen mounted on said crosshead, a second platen mounted on said base, a first mold section mounted on said first platen, and a second mold section mounted on the second platen, said mold sections separating along a mold parting plane and being operable when moved together to mold a part, a plurality of first hydraulic actuators mounted between said base and said second platen, said second platen comprising a rigid member supported by said first actuators and being movable for molding by said first actuators, retract means operable between the first and second platens for retracting said second platen subsequent to molding movement by said second actuators, rail means below said rigid member, wheel means on the rigid member aligned with said rail means, and means operable to permit moving the entire rigid member to position wherein the wheel means engage the rail means, said retract means being releasable from the second platen to permit the entire rigid member to roll along said rail means.

14. The apparatus of claim 13 wherein the retract means include elongated support blocks along the opposite sides of the rigid member, means on the rigid member is slidably mount the support blocks for sliding movement relative to the rigid member, a plurality of second actuators positioned to selectively provide a force reacted from said frame to said elongated support blocks in direction tending to separate the mold sections, said support blocks carrying the force from the second actuators to said rigid member to retract the second platen and thereby separate the mold sections.

15. The apparatus of claim 14 wherein the first and second actuators are single acting actuators, each of the first actuators and a separate one of the second actuators forming separate actuator pairs, and a single servo valve connected to operate each pair so that when each first actuator is permitted to retract the associated second actuator will be extended under pressure.

16. The apparatus of claim 14 wherein the means to mount the support blocks to the rigid member comprise an elongated groove defined in the rigid member and a laterally protruding support block rail on the support block which slides in the elongated groove.

17. The apparatus of claim 16 wherein the rigid member moves beyond the normal range of movement of the second actuators and support blocks when the rigid member is supported on the rails, and support means to support said support blocks independently of the rigid member when the rigid member is supported on the rail means, said support means including means to cause the support blocks to tilt relative to the rigid member and to cause the surfaces of the support block rails and mating elongated slot which normally engage when the second actuators are operated to release from each other.

* * * * *

UNITED STATES PATENT AND TRADEMARK OFFICE

CERTIFICATE OF CORRECTION

PATENT NO. : 4,470,787

DATED : September 11, 1984

INVENTOR(S) : Martin M. Gram

It is certified that error appears in the above-identified patent and that said Letters Patent is hereby corrected as shown below:

Column 1, line 3 (immediately following the title), --This is a continuation of United States patent application Serial No. 06/237,690, filed February 24, 1981, entitled "Hydraulic Press," now abandoned.--

This certificate supersedes Certificate of Correction issued March 26, 1985.

Signed and Sealed this

*Seventeenth* Day of *September 1985*

[SEAL]

*Attest:*

DONALD J. QUIGG

*Attesting Officer*

*Commissioner of Patents and Trademarks—Designate*